(12) United States Patent
Magri et al.

(10) Patent No.: US 12,413,300 B2
(45) Date of Patent: Sep. 9, 2025

(54) OPERATION OF AN OPTICAL TRANSCEIVER

(71) Applicant: Telefonaktiebolaget LM Ericsson (publ), Stockholm (SE)

(72) Inventors: Roberto Magri, Genoa (IT); Alberto Mari, Genoa (IT); Giorgio Andreoli Armanni, Genoa (IT); Stefano Parodi, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 369 days.

(21) Appl. No.: 17/908,013

(22) PCT Filed: Mar. 4, 2020

(86) PCT No.: PCT/EP2020/055595
§ 371 (c)(1),
(2) Date: Aug. 30, 2022

(87) PCT Pub. No.: WO2021/175418
PCT Pub. Date: Sep. 10, 2021

(65) Prior Publication Data
US 2023/0096534 A1    Mar. 30, 2023

(51) Int. Cl.
*H04B 10/00* (2013.01)
*H04B 10/073* (2013.01)
*H04B 10/40* (2013.01)

(52) U.S. Cl.
CPC .......... *H04B 10/073* (2013.01); *H04B 10/40* (2013.01)

(58) Field of Classification Search
CPC ...... H04B 10/40; H04B 10/073; H04B 10/25; H04B 10/27; H04B 10/0795;
(Continued)

(56) References Cited

U.S. PATENT DOCUMENTS 9,800,341 B2 * 10/2017 Lutgen ................. H04B 10/272
10,243,687 B2 * 3/2019 Zhao .................... H04J 14/0295
(Continued)

FOREIGN PATENT DOCUMENTS

EP    0944184 A2    9/1999
EP    3125444 A1    2/2017

OTHER PUBLICATIONS

"Common Public Radio Interface (CPRI); Interface Specification", CPRI Specification V7.0, Oct. 9, 2015, 128 pages.
(Continued)

*Primary Examiner* — Hanh Phan
(74) *Attorney, Agent, or Firm* — Sage Patent Group

(57) ABSTRACT

A system (600) is disclosed comprising an optical transceiver (610) and a portable device (620). The optical transceiver comprises a laser (612) configured to generate an optical signal and a port (614) operable to transmit an optical signal generated by the laser over an optical fiber connected to the port. The portable device comprises a video camera (622) and an optical display (624). The optical transceiver (610) is configured to transmit an optical signal containing connectivity information for an optical fiber connected to the port of the optical transceiver via the optical fiber. The portable device (620) is configured to receive the optical signal transmitted via the optical fiber using the portable device video camera, and to display the connectivity information contained in the optical signal on the portable device optical display. Also disclosed are a controller (1200, 1400) for an optical transceiver, a portable device (1300, 500), and methods performed by a controller and a portable device.

19 Claims, 12 Drawing Sheets

(58) Field of Classification Search
CPC ............ H04B 10/077; H04B 10/07955; H04B 10/2507; H04B 10/07957; H04B 10/532; H04B 10/516; H04B 10/548; H04J 14/0227
USPC ........ 398/66, 67, 68, 69, 70, 71, 72, 79, 33, 398/38, 135, 136, 137, 138, 139, 158, 398/159, 30, 31, 32, 16, 25, 26, 27, 10, 398/13, 17
See application file for complete search history.

(56) References Cited

U.S. PATENT DOCUMENTS

| | | |
|---|---|---|
| 2012/0086935 A1 | 4/2012 | Smith et al. |
| 2012/0275784 A1* | 11/2012 | Soto .................. H04B 10/2589 398/67 |
| 2017/0019169 A1* | 1/2017 | Yamamoto ........... H04B 10/073 |
| 2019/0387294 A1 | 12/2019 | Polland et al. |

OTHER PUBLICATIONS

"How to Use Your Smartphone as a Fibre Optic Tester", Network Centre, http://www.networkcentre.net/how-touse-your-Smartphone-as-a-fibre-optictester/, May 11, 2018, 11 pages.

* cited by examiner

OPERATION OF AN OPTICAL TRANSCEIVER

TECHNICAL FIELD

The present disclosure relates to methods for operating an optical transceiver and a portable device. The present disclosure also relates to a controller for an optical transceiver, a portable device, a system comprising an optical transceiver and a portable device, and to a computer program product configured to carry out methods for operating an optical transceiver and a portable device.

BACKGROUND

Serviceability of equipment and installations for communication networks is of increasing importance to network operators. Costs relating to installation, commissioning, integration and troubleshooting are a significant part of overall operational expenditure (OPEX). Simplifying the installation and troubleshooting phases of equipment deployment is therefore highly desirable.

With respect to optical fiber installations, automation of many aspects of installation, integration and configuration has been achieved, but some activities still require manual operations, making them time consuming and error prone. Fiber cabling is a manual operation that is usually performed by following connection matrices printed on paper. The printed matrices provide source and destination ports for equipment, optical distribution frames, etc. Following fiber and patch-cords paths can be highly challenging, and identifying and correcting fiber misconnection is a time consuming and difficult process. Cabling is therefore one of the major causes of integration issues for communication networks.

SUMMARY

It is an aim of the present disclosure to provide a controller for an optical transceiver, a portable device, a system and associated methods and computer readable media which at least partially address one or more of the challenges discussed above.

According to a first aspect of the present disclosure, there is provided a method for operating an optical transceiver, wherein the optical transceiver comprises a laser configured to generate an optical signal and a port operable to transmit an optical signal generated by the laser over an optical fiber connected to the port. The method is performed by a controller of the optical transceiver and comprises determining that a connection anomaly has occurred at a second end of an optical fiber, wherein a first end of the optical fiber is connected to the port of the optical transceiver. The method further comprises causing the laser of the optical transceiver to generate an optical signal containing connectivity information for the second end of the optical fiber, wherein a modulation scheme of the optical signal containing connectivity information for the second end of the optical fiber comprises on-off modulation.

According to another aspect of the present disclosure, there is provided a method for operating a portable device, wherein the portable device comprises a video camera and an optical display. The method comprises receiving, at the video camera, an optical signal containing connectivity information for a second end of an optical fiber, wherein the second end of the optical fiber is optically coupled to the video camera, and wherein a first end of the optical fiber is connected to an optical transceiver. The method further comprises extracting the connectivity information for the second end of the optical fiber from the received optical signal, and displaying the extracted connectivity information for the second end of the optical fiber on the optical display of the portable device. A modulation scheme of the optical signal containing connectivity information for the second end of the optical fiber comprises on-off modulation.

According to another aspect of the present disclosure, there is provided a system comprising and optical transceiver and a portable device. The optical transceiver comprises a laser configured to generate an optical signal and a port operable to transmit an optical signal generated by the laser over an optical fiber connected to the port. The optical transceiver is configured to transmit an optical signal containing connectivity information for an optical fiber connected to the port of the optical transceiver via the optical fiber. The portable device comprises a video camera and an optical display. The portable device is configured to receive the optical signal transmitted via the optical fiber using the portable device video camera, and to display the connectivity information contained in the optical signal on the portable device optical display.

According to another aspect of the present disclosure, there is provided a computer program comprising instructions which, when executed on at least one processor, cause the at least one processor to carry out a method according to either of the preceding aspects of the present disclosure.

According to another aspect of the present disclosure, there is provided a controller for an optical transceiver, wherein the optical transceiver comprises a laser configured to generate an optical signal and a port operable to transmit an optical signal generated by the laser over an optical fiber connected to the port. The controller comprises processing circuitry configured to cause the optical transceiver to determine that a connection anomaly has occurred at a second end of an optical fiber, wherein a first end of the optical fiber is connected to the port of the optical transceiver. The processing circuitry is further configured to cause the laser of the optical transceiver to generate an optical signal containing connectivity information for the second end of the optical fiber, wherein a modulation scheme of the optical signal containing connectivity information for the second end of the optical fiber comprises on-off modulation.

According to another aspect of the present disclosure, there is provided a portable device comprising a video camera, an optical display, and processing circuitry configured to cause the portable device to receive, at the video camera, an optical signal containing connectivity information for a second end of an optical fiber, wherein the second end of the optical fiber is optically coupled to the video camera, and wherein a first end of the optical fiber is connected to an optical transceiver. The processing circuitry is further configured to cause the portable device to extract the connectivity information for the second end of the optical fiber from the received optical signal, and display the extracted connectivity information for the second end of the optical fiber on the optical display of the portable device. A modulation scheme of the optical signal containing connectivity information for the second end of the optical fiber comprises on-off modulation.

BRIEF DESCRIPTION OF THE DRAWINGS

For a better understanding of the present disclosure, and to show more clearly how it may be carried into effect, reference will now be made, by way of example, to the following drawings, in which.

DETAILED DESCRIPTION

Aspects and examples of the present disclosure provide methods and apparatus that assist a field engineer with identifying a correct connection for optical fibers without requiring dedicated instrumentation or connection to an equipment management interface. Connection information for a fiber is provided to the engineer by proximity coupling the fiber patch-cord termination to a device camera, such as a smartphone camera. The camera acts as optical receiver of low-speed connection data transmitted along the fiber. Transmission of the connection data is performed by the host of the transceiver connected to the other end of the fiber under identification using on-off modulation. The fiber thus communicates data related to its own connection, the data including for example Source and Destination Node/Port IDs or other service information. Using a smartphone as the portable device for receiving the connection information ensures that no dedicated hardware is required. The present disclosure proposes using a smartphone as a data receiver of an optical transmission from a system equipment.

Examples of the present disclosure seek to assist a field engineer on site in identifying a fiber connection without relying on printed configuration matrices. Connection information is instead provided via the fiber itself, for example by proximity coupling the fiber patch-cord termination to a smartphone camera lens. The camera, operating as a video camera, thus acts as optical receiver of low-speed data transmitted along the fiber. The transmission is performed by the host of the transceiver connected to the other end of fiber under identification by simply switching on and off the laser (on-off modulation) when fiber is disconnected. In some examples of the present disclosure, this is referred to as operation in "connectivity assist" mode, or Sign Of Light state (SOL). This SOL state may replace or augment the existing Loss of Signal (LOS) state with a more useful and information-bearing state. As discussed in greater detail below, the data provided in SOL state may include:

Fiber Host ID information (Source Node ID/Port ID)
Fiber Connection Instructions (destination Node ID/Port ID)

Traffic related information (e.g. protocol)
Any custom information

Figure 1:
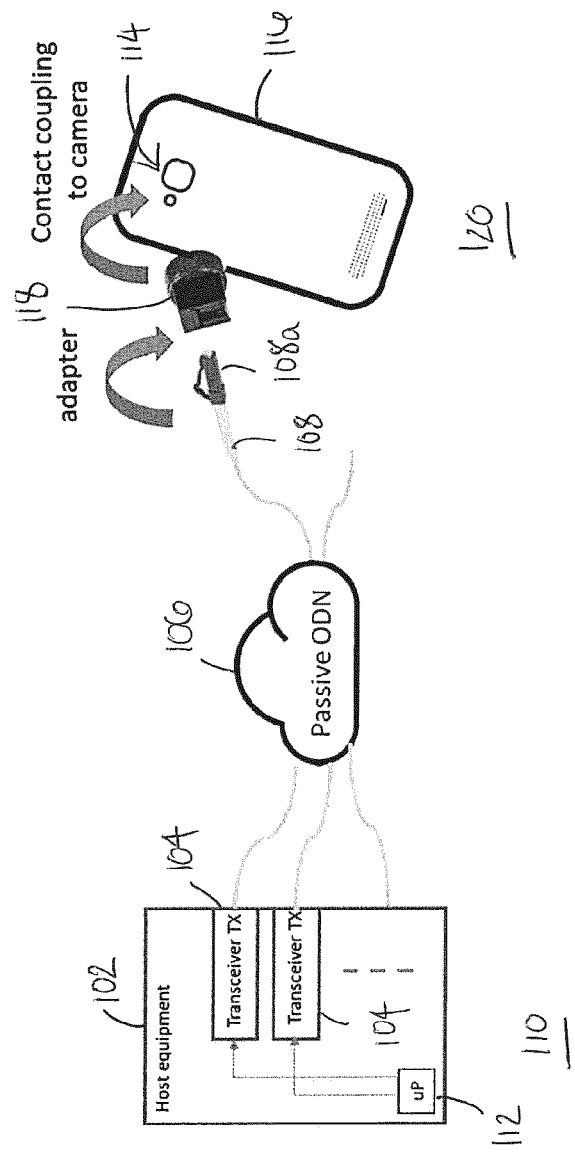
FIG. 1 illustrates a host equipment, optical distribution network and portable device.

FIG. 1 provides an overview of how examples of the present disclosure may be implemented. Referring to FIG. 1, a host equipment 102 may comprise a plurality of optical transceivers 104. The host equipment 102 at a first site 110 is to be connected to equipment at a second (remote) site 120 via a passive Optical Distribution Network (ODN) 106. To provide a connection between the first and second sites, it may be necessary to connect a fiber patch cord or cable 108 at the second site 120. According to examples of the present disclosure, the User Plane (uP) 112 at the Host Equipment 102 initiates timed laser on/off software commands to be sent by the transceiver 104 so as to transmit connection information for the fiber 108 as a low speed on-off modulated signal. The end termination 108a of the fiber 108 is proximity coupled to the camera 114 of a smartphone 116, for example via an adapter 118. The adapter may for example be of the type used for a conventional optical power meter. The adapter 118 should be held in front of the camera 114 either by hand or using dedicated connector on the smartphone. The adapter should ensure that the entire camera lens is covered, so that black image is detected in absence of light transmitted through the fiber. Alternatively, the end termination 108a may be coupled directly to the camera 114 without an adapter.

As discussed in greater detail below, the speed of transmission of the connection information is limited by the camera frame rate, i.e. the video camera frame rate. The information may be encoded and decoded in an application on the smartphone. Alternatively, the limited signaling rate allows for implementation at Host uP level: uP.

Any passive ODN may be deployed between the transceiver 104 and the fiber end 108a, provided the power budget is within the smartphone sensitivity range. Generally, a conventional smartphone camera can easily detect 800 nm light ($1^{st}$ telecom window), and many smartphone cameras can detect 1300 nm light ($2^{nd}$ telecom window), even if with reduced sensitivity. The 1550 nm light used in DWDM systems may require either the integration of an IR-extended camera in the smartphone to receive the on-off modulated connectivity information, or use of an external camera covering the 1500 nm range. Such a camera could be connected to the smartphone, for example via USB connection. It will be appreciated however that in $4^{th}$ and $5^{th}$ Generation mobile communication Radio Access Networks, 1300 nm is the most common technology.

FIGS. 2 to 5 are flow charts illustrating methods which may be performed by an optical transceiver controller and a portable device according to different examples of the present disclosure. The flow charts of FIGS. 2 to 5 are presented below, followed by a detailed discussion of how different process steps illustrated in the flow charts may be implemented according to examples of the present disclosure.

Figure 2:
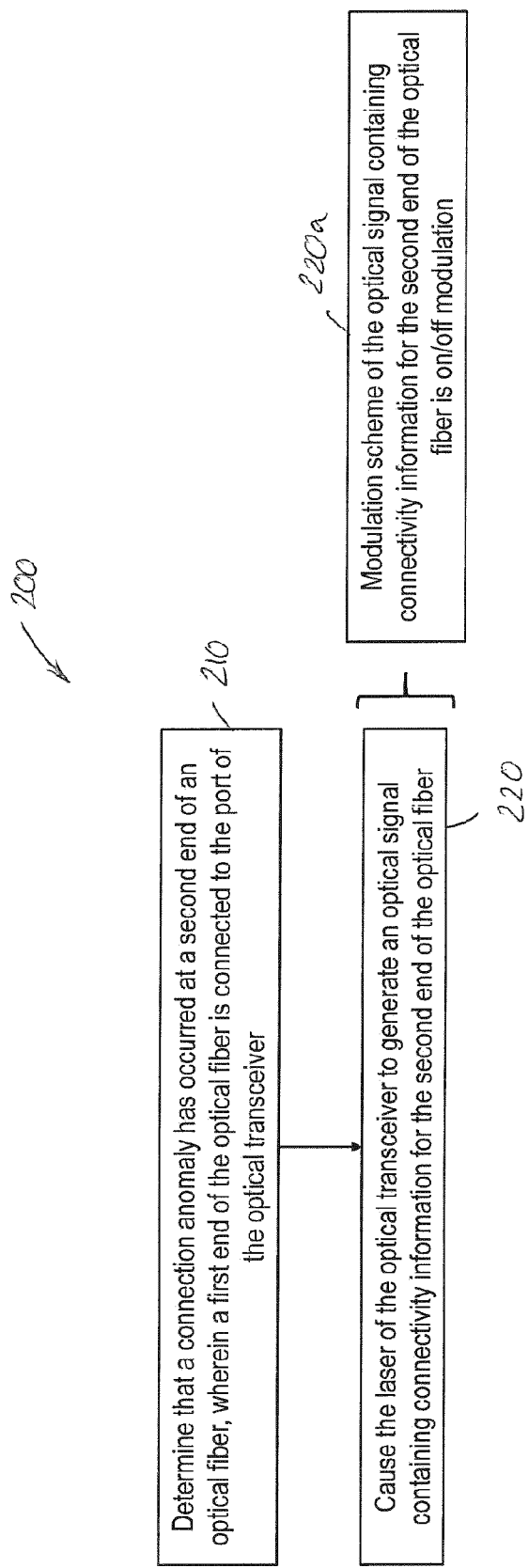
FIG. 2 is a flow chart illustrating process steps in a method for operating an optical transceiver.

FIG. 2 is a flow chart illustrating process steps in a method 200 for operating an optical transceiver, wherein the optical transceiver comprises a laser configured to generate an optical signal and a port operable to transmit an optical signal generated by the laser over an optical fiber connected to the port. The method 200 is performed by a controller of the optical transceiver and comprises, in a first step 210, determining that a connection anomaly has occurred at a second end of an optical fiber, wherein a first end of the optical fiber is connected to the port of the optical transceiver. The method further comprises, in step 220, causing the laser of the optical transceiver to generate an optical signal containing connectivity information for the second end of the optical fiber. As illustrated at step 220a, a modulation scheme of the optical signal containing connectivity information for the second end of the optical fiber comprises on-off modulation.

Figure 3:
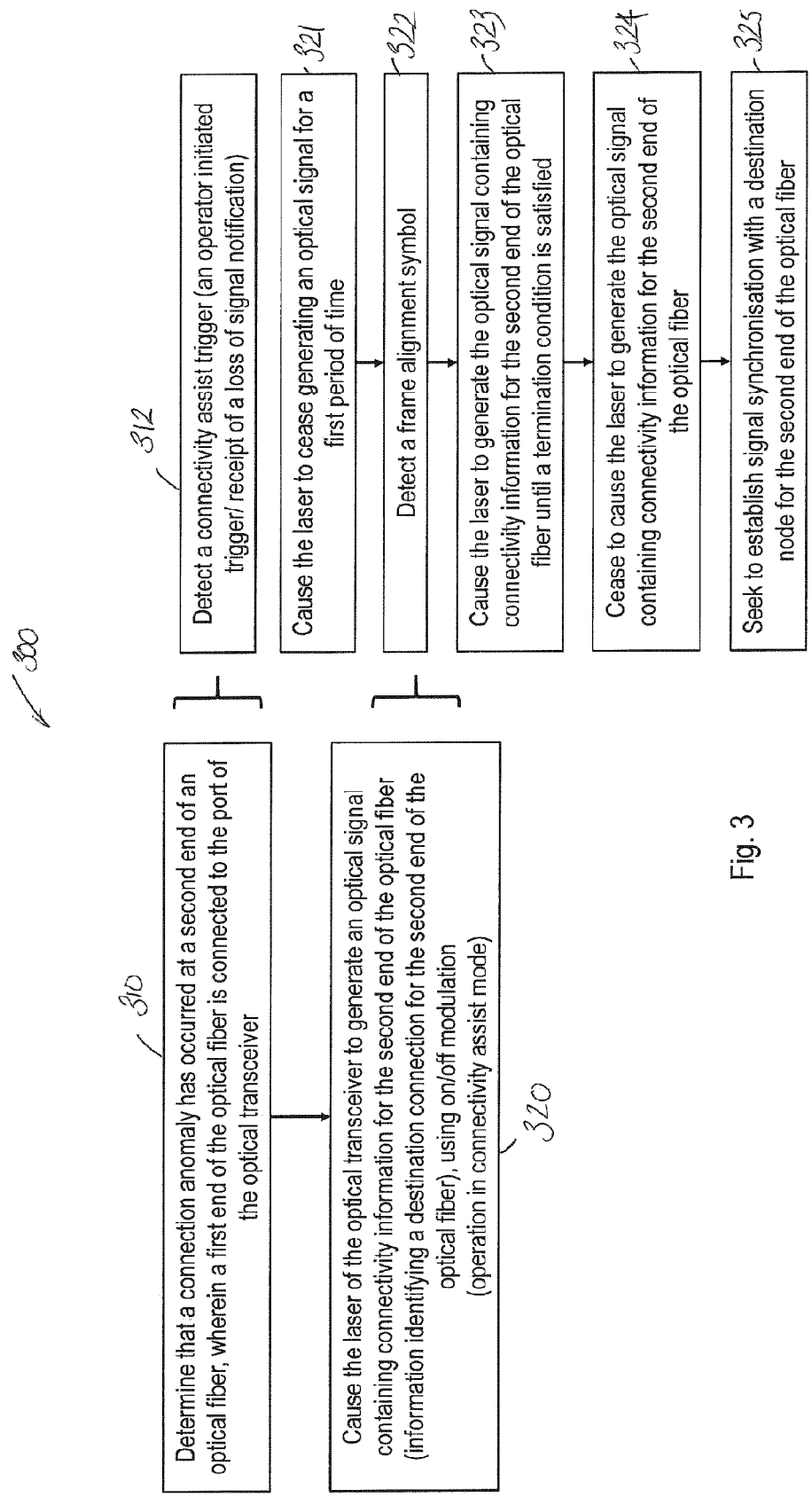
FIG. 3 is a flow chart illustrating process steps in another example of method for operating an optical transceiver.

FIG. 3 is a flow chart illustrating process steps in another example of method 300 for operating an optical transceiver, wherein the optical transceiver comprises a laser configured to generate an optical signal and a port operable to transmit an optical signal generated by the laser over an optical fiber connected to the port. The steps of the method 300 illustrate one way in which the steps of the method 200 may be implemented and supplemented in order to achieve the above discussed and additional functionality. As for the method of FIG. 2 above, the method 300 is performed by a controller of the optical transceiver.

Referring to FIG. 3, in a first step 310, the controller determines that a connection anomaly has occurred at a second end of an optical fiber, wherein a first end of the optical fiber is connected to the port of the optical transceiver. As illustrated at step 312, this may comprise detecting a connectivity assist trigger, which may comprise an operator initiated trigger or may comprise receipt of a loss of signal notification. In step 320, in response to determining that a connection anomaly has occurred at the second end of the optical fiber, the controller causes the laser of the optical transceiver to generate an optical signal containing connectivity information for the second end of the optical fiber, wherein a modulation scheme of the optical signal containing connectivity information for the second end of the optical fiber comprises on-off modulation. In on-off modulation, the laser transmits information comprising symbols defined only by the laser being on (transmitting) or off (not transmitting). The sequence of on and off pulses provides data information to the receiver.

In some examples, the controller of the optical transceiver may be configured to use an operational bit rate and modulation scheme for transmission of data by the optical transceiver in a service provision operational mode. The service provision operation mode is a mode corresponding to normal operation of the transceiver, in which a full connection is established between the sites. The bit rate and modulation scheme of the optical signal containing connectivity information for the second end of the optical fiber may be different to the operational bitrate and modulation scheme. For example, the bitrate of the optical signal containing connectivity information may be less than the operational bitrate. The optical signal containing connectivity information is only transmitting for the purposes of establishing a full connection, and so the information bit rate may be significantly lower than the operational bitrate. Regarding modulation, the optical signal containing connectivity information is on-off modulated, whereas the optical transceiver may be configured to use, for example, a different or more complex modulation scheme, e.g. an amplitude and phase modulation scheme for operational service provision.

As illustrated at step 320, the connectivity information contained in the optical signal may comprise information identifying a destination connection for the second end of the optical fiber. The connectivity information may alternatively or additionally comprise any one or more of:
 a destination node identifier for the second end of the optical fiber
 a destination port identifier for the second end of the optical fiber,
 a node identifier of a node associated with the optical transceiver,
 a port identifier of the port of the optical transceiver,
 a traffic identifier for the optical fiber, and/or
 a network identifier for the optical fiber.

As illustrated in FIG. 3, the step 320 of causing the laser of the optical transceiver to generate an optical signal containing connectivity information for the second end of the optical fiber may comprise operating the optical transceiver in a connectivity assist mode. This step may be implemented via a series of sub steps, as set out in FIG. 3.

Optionally, in step 321, the controller may cause the laser to cease generating an optical signal for a first period of time, before transmitting a frame alignment symbol in step 322. In step 323, the controller may cause the laser to generate the optical signal containing connectivity information for the second end of the optical fiber until a termination condition is satisfied. Finally, in step 325, on satisfaction of the termination condition, the controller may cease to cause the laser to generate the optical signal containing connectivity information for the second end of the optical fiber. Examples of the termination condition may include a timer or a counter for a number of repetitions of the connectivity information.

On ceasing to generate the optical signal containing connectivity information for the second end of the optical fiber, the controller may seek to establish signal synchronisation with a destination node for the second end of the optical fiber. In some examples of the present disclosure, the controller may cycle between operation in "connectivity assist" mode, in which connectivity information is transmitted, and seeking to establish synchronisation, until synchronisation is established when the second end of the fiber is correctly connected.

Figure 4:
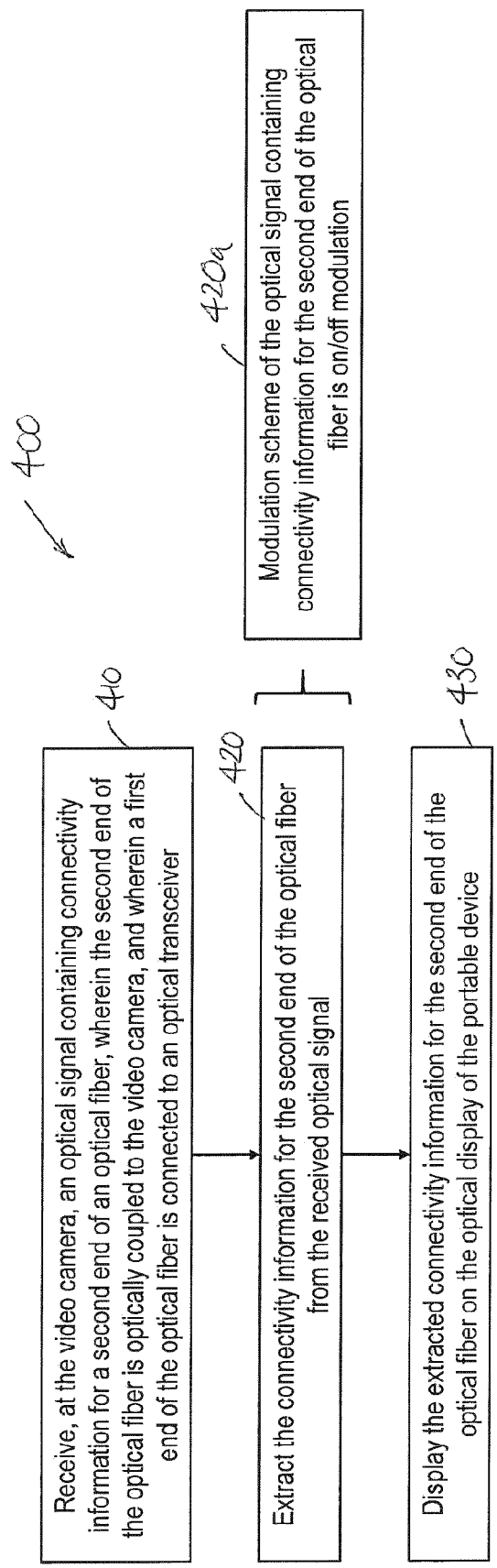
FIG. 4 is a flow chart illustrating process steps in a method for operating a portable device.
Figure 5:
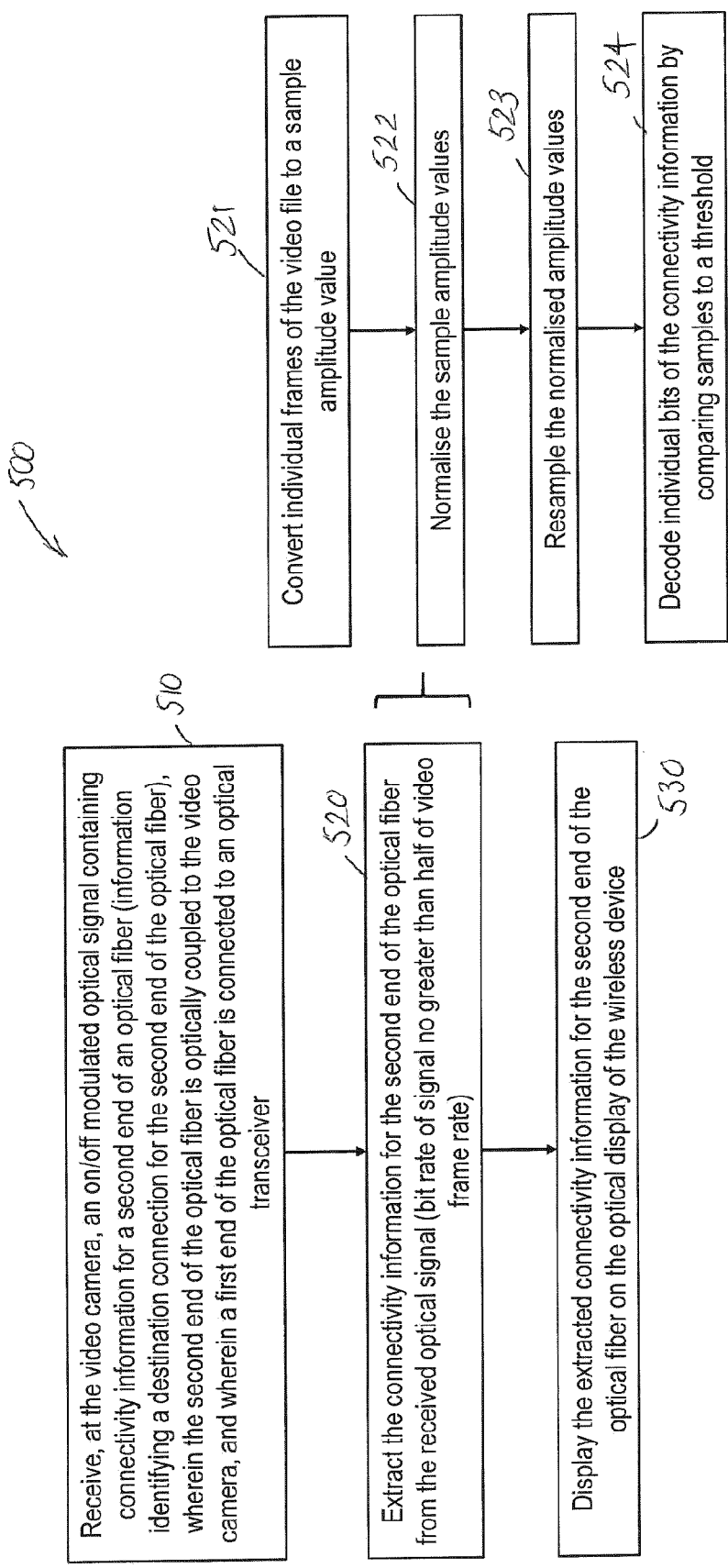
FIG. 5 is a flow chart illustrating process steps in another example of method for operating a portable device.

The method 200 and/or 300, performed by the controller of an optical transceiver, may be complemented by a method performed by a portable device, as illustrated in FIGS. 4 and 5 and described below.

FIG. 4 is a flow chart illustrating process steps in a method 400 for operating a portable device, wherein the portable device comprises a video camera and an optical display. The portable device may for example comprise a wireless device such as a UE or smartphone. The video camera may be integrated with the portable device or may be operatively coupled to the portable device. Referring to FIG. 4, the method, performed by the portable device, comprises, in a first step 410, receiving at the video camera of the portable device an optical signal containing connectivity information for a second end of an optical fiber, wherein the second end of the optical fiber is optically coupled to the video camera, and wherein a first end of the optical fiber is connected to an optical transceiver at a different site. In one example, the second end of the optical fiber may be optically coupled to the video camera via proximity coupling. In a further example, a suitable adaptor may be fitted to the wireless device to support the second end of the optical fiber in proximity to the video camera.

In step 420, the method comprises extracting the connectivity information for the second end of the optical fiber from the received optical signal, wherein, as illustrated at 420a, a modulation scheme of the optical signal containing connectivity information for the second end of the optical fiber comprises on-off modulation. In step 430, the method comprises displaying the extracted connectivity information for the second end of the optical fiber on the optical display of the portable device.

FIG. 5 is a flow chart illustrating process steps in another example of method 500 for operating a portable device, wherein the portable device comprises a video camera and an optical display. The portable device may for example comprise a wireless device such as a UE or smartphone. The video camera may be integrated with the portable device or may be operatively coupled to the portable device. The steps of the method 500 illustrate one way in which the steps of the method 400 may be implemented and supplemented in order to achieve the above discussed and additional functionality. As for the method of FIG. 4 above, the method 500 is performed by the portable device.

Referring to FIG. 5, in a first step 510, the portable device receives, at the video camera, an optical signal containing connectivity information for a second end of an optical fiber, wherein the second end of the optical fiber is optically coupled to the video camera, and wherein a first end of the optical fiber is connected to an optical transceiver. As illustrated at step 510, a modulation scheme of the optical signal containing connectivity information for the second end of the optical fiber comprises on-off modulation.

As illustrated at step 510, the connectivity information contained in the optical signal may comprise information identifying a destination connection for the second end of the optical fiber. The connectivity information may alternatively or additionally comprise any one or more of:
  a destination node identifier for the second end of the optical fiber
  a destination port identifier for the second end of the optical fiber,
  a node identifier of a node associated with the optical transceiver,
  a port identifier of the port of the optical transceiver,
  a traffic identifier for the optical fiber, and/or
  a network identifier for the optical fiber.

In step 520, the portable device extracts the connectivity information for the second end of the optical fiber from the received optical signal. As illustrated at step 520, in some examples of the present disclosure, a bit rate of the received optical signal may be no greater than half a frame rate of the video camera. The bit rate (bits/s) may alternatively be referred to as a symbol rate (symbols/s). For example, the bit or symbol rate of the received optical signal may be less than one of: 15 bits/s, 12.5 bits/s, 10 bits/s and 5 bits/s (or less than 15 symbols/s, 12.5 symbols/s, 10 symbols/s or 5 symbols/s).

The step 520 of extracting the connectivity information for the second end of the optical fiber from the received optical signal may optionally be implemented via a plurality of sub steps as illustrated at 521 to 524, the sub steps performed for a video file captured by the video camera during reception of the optical signal.

In some examples, one or more optional processing processes may be carried out on the video images captured by the video camera. For example, the portable device may initially convert a video to greyscale, if a colour video file has been captured from the video camera. In step 521, the portable device converts individual frames of the video file to a sample amplitude value. In step 522 the portable device optionally normalises the sample amplitude values for example to a desired scale. The normalisation may cause the values to be between two predetermined values, e.g. 0 and 255, as 255 corresponds to the maximum pixel value from a video frame. The sample amplitude values may have arbitrary timing phases and a sampling frequency that is different from the symbol frequency of the transmitter. The portable device may therefore optionally resample the normalised amplitude values in step 523, for example using the video frame rate as sampling clock reference. The resampling may ensure a sampling rate that is synchronised with the transmitter and may optimise the sampling time for data decoding. The resampling may be with a higher sample rate than the video frame rate. The resampling to samples which are synchronized with the transmitter provides for samples which are optimized for decoding of the symbols, i.e. at a time which maximises the difference between an "on" symbol and an "off" symbol. In step 524, the portable device decodes individual bits of the connectivity information by comparing samples to a threshold.

Having extracted the connectivity information from the received optical signal, the portable device then, in step 530, displays the extracted connectivity information for the second end of the optical fiber on the optical display of the portable device.

Figure 6:
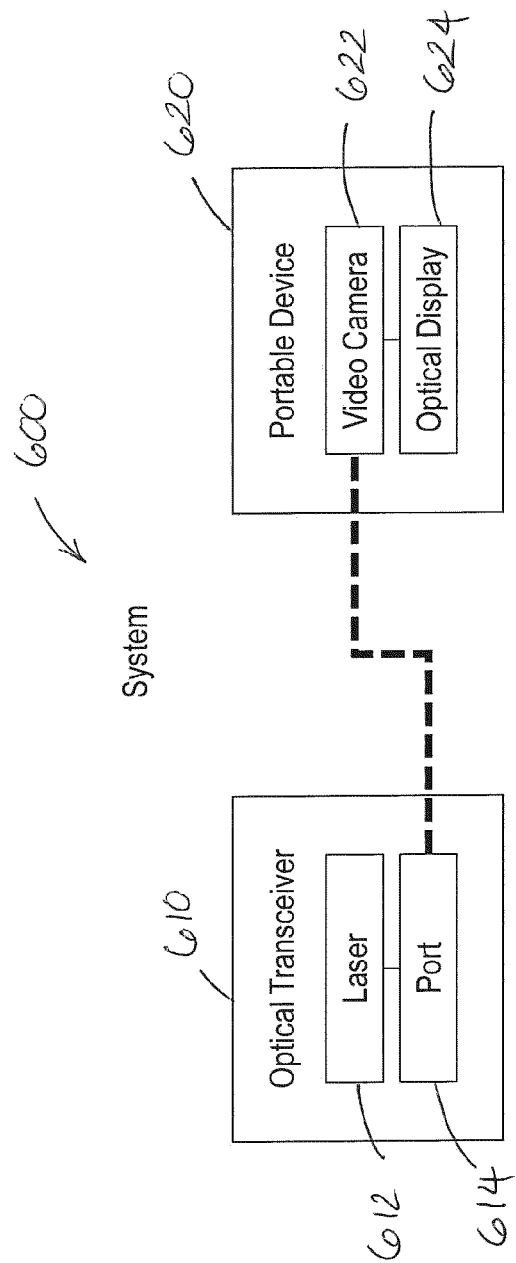
FIG. 6 is a block diagram illustrating a system.

According to another example of the present disclosure, there is provided a system 600, illustrated in FIG. 6. The system 600 comprises an optical transceiver 610 and a portable device 620. The optical transceiver 612 may be controlled by a controller 1200 or 1400, as described in further detail below. The portable device 620 may comprise a portable device 1300 or 1500, also as described in further detail below. The optical transceiver 610 comprises a laser 612 configured to generate an optical signal, and a port 614 operable to transmit an optical signal generated by the laser 612 over an optical fiber connected to the port. The portable device 620 comprises a video camera 622 and an optical display 624. The optical transceiver 610 is configured to transmit an optical signal containing connectivity information for an optical fiber connected to the port of the optical transceiver via the optical fiber. The portable device 620 is configured to receive the optical signal transmitted via the optical fiber using the portable device video camera 622, and to display the connectivity information (or information/instructions obtained from the connectivity information) contained in the optical signal on the portable device optical display 624. The optical transceiver 610 may be configured to transmit the optical signal containing connectivity information using an on-off modulation scheme, and may also be configured to transmit the optical signal containing connectivity information at a bit rate that is no greater than half the frame rate of the video camera 622 of the portable device 620. The optical transceiver may for example be configured to carry out a method 200 and/or 300, and the portable device may be configured to carry out a method 400 and/or 500.

FIGS. 2 to 6 discussed above provide an overview of methods and a system which may cooperate to provide connectivity information for an optical fiber via the fiber itself. There now follows a detailed discussion of how different process steps illustrated in FIGS. 2 to 5 and discussed above may be implemented according to examples of the present disclosure.

Referring initially to the optical transceiver, operation in the "connectivity assist" mode, or SOL state, may be triggered manually or automatically at step 312. For manual triggering, a field engineer or the operator at the Network Operations Centre (NOC) may place host equipment within which the optical transceiver is incorporated into SOL Mode. For automatic triggering, an additional State may be implemented on top of a system State Machine of the host equipment. The SOL state may be entered when a LOS is detected or notified. In the SOL state the laser of the optical transceiver sends a number of Data Sequences including connectivity information on the broken fiber and then reverts to the original destination state for a LOS, that is to the state that the system would have entered on LOS, if the SOL state did not exist. The number of Data Sequences may be preconfigured or may be based on a timer. If the fiber remains disconnected, then the SOL state may be re-entered again by both end hosts and a new SOL Data Sequence will be transmitted. If the fiber is connected, the system will exit the SOL state and continue operating from the state in which the system was before loss of signal. An example concept state machine is illustrated in FIG. 7.

Figure 7:
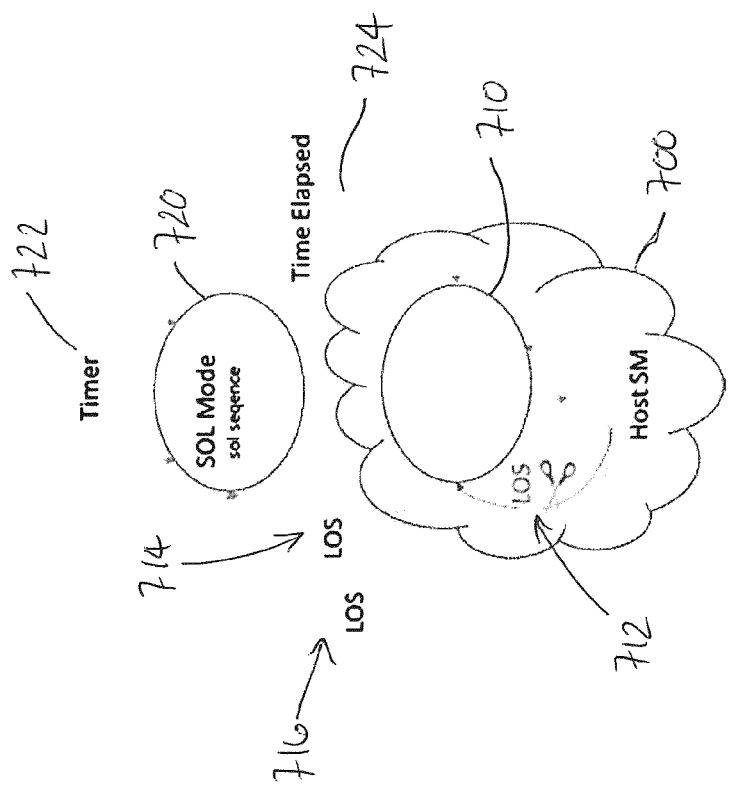
FIG. 7 illustrates a concept state machine.

Referring to FIG. 7, a host equipment State Machine 700 include a destination state for a Loss of Signal (LOS) event 712. According to examples of the present disclosure, the SOL state 720 may be added as a new destination state for a LOS event. The SOL state may be entered from the original destination state 710 via LOS event 714, or may be entered directly from normal operation via a LOS event 716. When in the SOL state 720, the SOL Data Sequence including connectivity information for the fiber affected by the LOS event is transmitted. A timer 722 may be used to control exit from the SOL state. If signal synchronization is reestablished, then the host equipment may transition back to the appropriate operational state of the state machine 700. If the timer expires before signal synchronization is reestablished, the host equipment may transition back 724 to the original destination state for loss of signal. The host equipment may then reenter the SOL state in the event of continuing LOS 714.

As approach as illustrated in FIG. 7 could be integrated with the CPRI state machine illustrated in the Common Public Radio Interface (CPRI) Interface Specification Version 7.0. In such an integration, instead of entering the L1 Sync State (State B) on LOS, the SOL state would be entered instead, returning to State B after the SOL state timer has elapsed. At this point if LOS is no longer present, the system may continue in state B, completing the synchronization phase as it would have done if transitioning directly to state B on LOS. Such integration would not adversely impact system behavior as the synchronization in State B would fail during LOS. It will be appreciated that the proposed integration with the CIPRI state machine is described merely for the purposes of illustration, and integration with any system state machine may be achieved in a similar manner.

Figure 8:
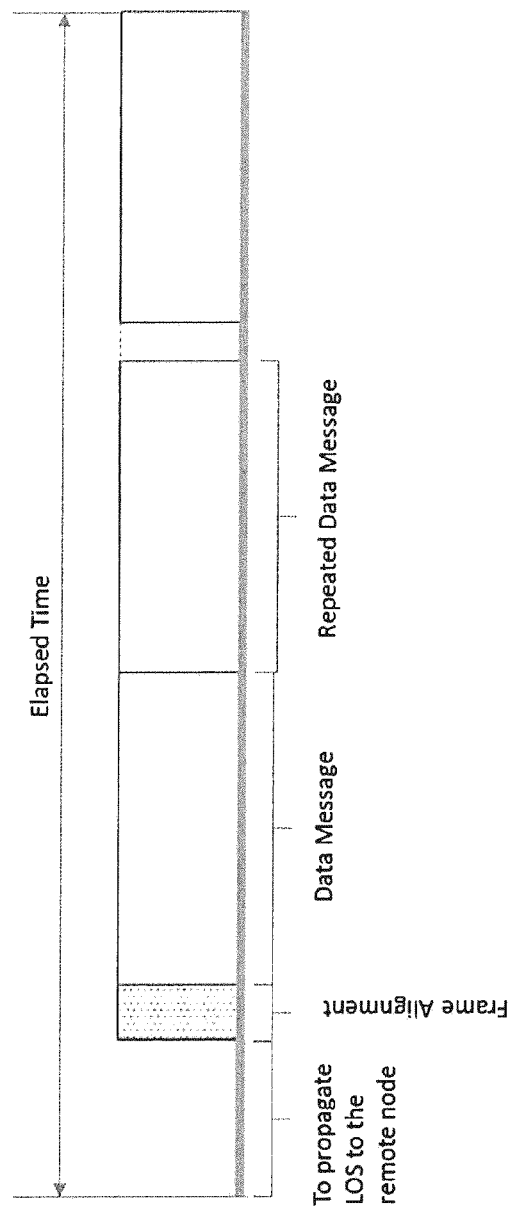
FIG. 8 illustrates an example data sequence.

FIG. 8 illustrates an example of the SOL data sequence structure which may be transmitted containing connectivity information. Referring to FIG. 8, a short period of '0' is initially transmitted in order to trigger the LOS condition to the remote node to enter the "SOL state". In this way, the LOS condition may be propagated to both sites affected by the LOS. This is similar to the Automatic Laser Shutdown (ALS) procedure specified in ITU-T recommendation G.664. Following the zero transmission period, and after transmission of the one or more Frame Alignment symbol(s), the data message comprising connectivity information for the disconnected fiber is transmitted a preconfigured number of times and/or until a timer elapses, at which point the SOL state is exited. The SOL signaling with the given frame structure may be performed by both main sites and terminals (owing to LOS propagation). The frame alignment symbols may be detected by the portable device to determine when the connectivity information starts.

Considering now the portable device, such as a smartphone, the feasibility of methods according to the present disclosure was tested by transmitting a random bit sequence at 10 bits/s and receiving it with a typical smartphone having an example video camera frame rate of 25 fps. The camera frame rate sets the maximum transmission speed achievable according to sampling theory. In the feasibility testing, the video was saved and post-processed with MATLAB, although it is envisaged that a practical implementation would involve processing using a dedicated application installed on the smartphone.

As discussed above, the random bit sequence was modulated with a software script that sent ON/OFF commands to a transceiver laser via host uP at 10 Hz. The optical fiber connected to the transceiver was put into contact with the smartphone camera through an adapter, and a video of the light signal received through the fiber was recorded. Each video frame is processed to determine the transmitted symbol (i.e. light on or off). For example, in some examples, each video frame is converted to black and white. In some aspects, each video frame is transformed to a sample amplitude value by taking the brightest pixel value:

$$\text{amplitude}=\max(\max(\text{video\_frame}))$$

The two max operations in the above equation are related to rows and columns of the pixel matrix, i.e. the maximum amplitude from any row and from any column is used as the sampled amplitude. It will be appreciated that more other metrics may be used to obtain a sample amplitude value, for example, a plurality of the pixel values may be averaged and/or one or more pixel values (e.g. the highest or lowest) may be excluded from the processing.

Figure 9:
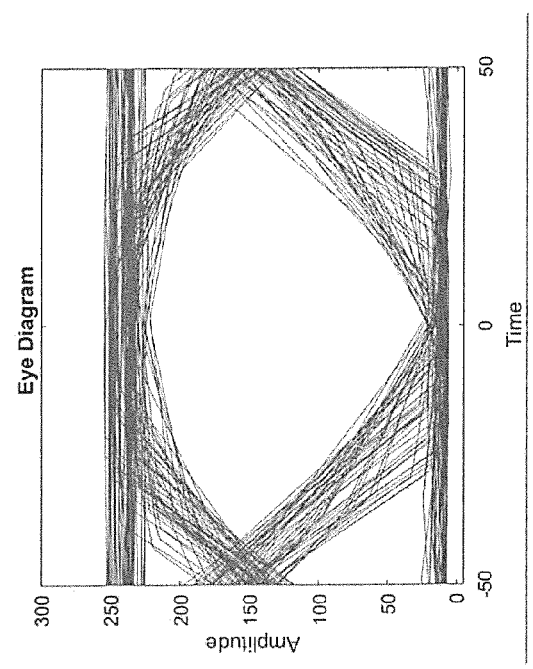

The samples obtained in the above manner were then normalized and resampled (at 1 KHz) using the video frame rate as sampling clock reference. The resulting eye diagram is illustrated in FIG. 9 for a received power of −1 dBm (typical of standard Small Form-Factor Pluggable (SFPs)). The eye in FIG. 9 is wide open, confirming good performance, i.e. good identification of the transmitted symbols.

Figure 10:
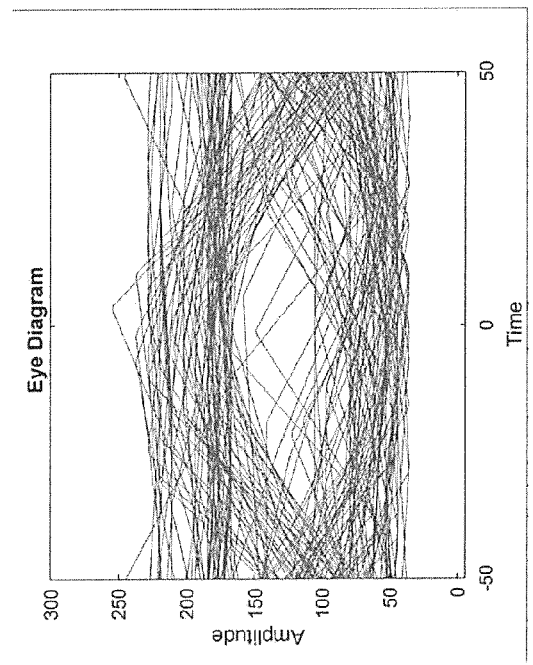
FIGS. 9 and 10 are eye diagrams.
Figure 11:
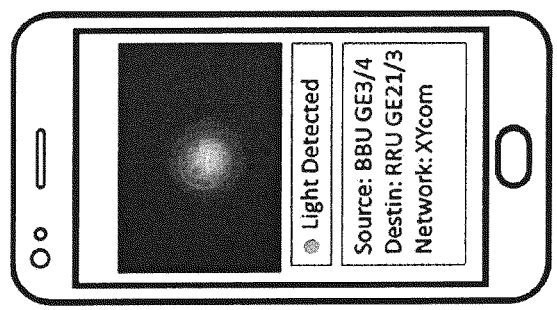
FIG. 11 is an illustration of a portable device display.

The bits of the bit sequence were then decoded by comparing the samples taken at the highest eye-opening point and comparing them to a given threshold (e.g. the mid amplitude of 128). In order to assess the sensitivity of the smartphone camera, the received signal was attenuated down to −14 dBm with an optical attenuator. This corresponds to more than 40 Km of typical access fibers. The resulting eye diagram, illustrated in FIG. 10, is more closed but the data is still recoverable. In both the situations of FIG. 9 and FIG. 10, error-free data detection was achieved. It is envisaged that in operation, the post processing phase will be carried out by processing circuitry of the smartphone, e.g. in an application. For example, the processing circuitry may be configured to save the received video and produce the decoded connectivity information (or information resulting from the connectivity information) on the screen, as illustrated in FIG. 11. For example, the portable device is configured to display one or more of the types of data transmitted in the connectivity information, e.g. information relating to the destination node identifier for the second end of the optical fiber, destination port identifier for the second end of the optical fiber, node identifier of a node associated with the optical transceiver, port identifier of the port of the optical transceiver, traffic identifier for the optical fiber, and/or, a network identifier for the optical fiber. In some examples, the portable device may be configured to show the video image being received by the portable device, e.g. for the purpose of checking that the portable device is correctly receiving the optical signal.

Depending on the application development environment and operating system functionalities, the application could operate real-time displaying of data or could provide Light Alignment information in real time, store the received video and then provide the decoded connectivity information at the end of the video.

As discussed above, the methods 200 and 300 are performed by a controller of an optical transceiver, and the methods 400 and 500 are performed by a portable device. The present disclosure provides a controller which is adapted to perform any or all of the steps of the methods 200 and/or 300, and a portable device which is adapted to perform any or all of the steps of the methods 400 and/or 500.

Figure 12:
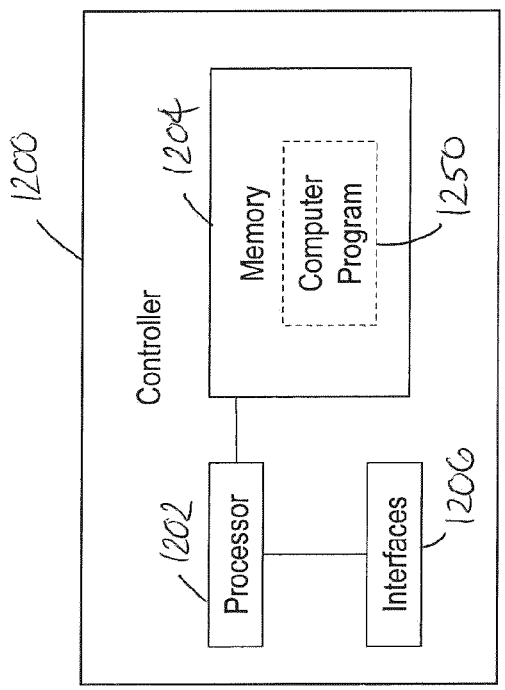
FIG. 12 is a block diagram illustrating functional modules in a controller.

FIG. 12 is a block diagram illustrating a controller 1200 which may be adapted to implement the method 200 and/or 300 according to examples of the present disclosure, for example on receipt of suitable instructions from a computer program 1250. Referring to FIG. 12, the controller 1200 comprises a processor or processing circuitry 1202, and may comprise a memory 1204 and interfaces 1206. The processing circuitry 1202 is operable to perform some or all of the steps of the method 200 and/or 300 as discussed above with reference to FIGS. 2 and 3. The memory 1204 may contain instructions executable by the processing circuitry 1202 such that the controller 1200 is operable to perform some or all of the steps of the method 200 and/or 300. The instructions may also include instructions for executing one or more telecommunications and/or data communications protocols. The instructions may be stored in the form of the computer program 1250. In some examples, the processor or processing circuitry 1202 may include one or more microprocessors or microcontrollers, as well as other digital hardware, which may include digital signal processors (DSPs), special-purpose digital logic, etc. The processor or processing circuitry 1202 may be implemented by any type of integrated circuit, such as an Application Specific Integrated Circuit (ASIC), Field Programmable Gate Array (FPGA) etc. The memory 1204 may include one or several types of memory suitable for the processor, such as read-only memory (ROM), random-access memory, cache memory, flash memory devices, optical storage devices, solid state disk, hard disk drive etc.

Figure 13:
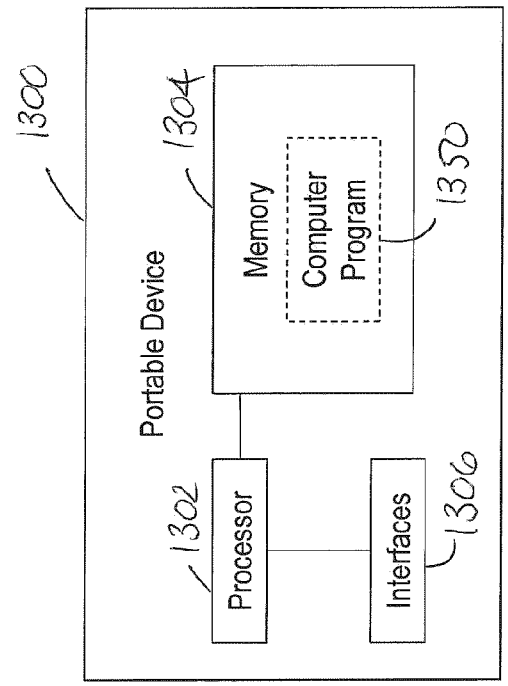
FIG. 13 is a block diagram illustrating functional modules in another example of controller.

FIG. 13 is a block diagram illustrating a portable device 1300 which may be adapted to implement the method 400 and/or 500 according to examples of the present disclosure, for example on receipt of suitable instructions from a computer program 1350. Referring to FIG. 13, the portable device 1300 comprises a processor or processing circuitry 1302, and may comprise a memory 1304 and interfaces 1306. The interfaces may comprise hardware and/or software interfaces and may facilitate communication between hardware or software elements of the portable device. For example, the interfaces 1306 may include an interface between the processing circuitry and a display, and/or between the processing circuitry and radio circuitry, as discussed below. The processing circuitry 1302 is operable to perform some or all of the steps of the method 400 and/or 500 as discussed above with reference to FIGS. 4 and 5. The memory 1304 may contain instructions executable by the processing circuitry 1302 such that the portable device 1300 is operable to perform some or all of the steps of the method 400 and/or 500. The instructions may also include instructions for executing one or more telecommunications and/or data communications protocols. The instructions may be stored in the form of the computer program 1350. In some examples, the processor or processing circuitry 1302 may include one or more microprocessors or microcontrollers, as well as other digital hardware, which may include digital signal processors (DSPs), special-purpose digital logic, etc. The processor or processing circuitry 1302 may be implemented by any type of integrated circuit, such as an Application Specific Integrated Circuit (ASIC), Field Programmable Gate Array (FPGA) etc. The memory 1304 may include one or several types of memory suitable for the processor, such as read-only memory (ROM), random-access memory, cache memory, flash memory devices, optical storage devices, solid state disk, hard disk drive etc. In some examples, the portable device 1500 comprises radio circuitry configured to connect to a radio access network. The radio access network may be, for example, a LTE or NR cellular network. In some aspects, the portable device 1500 may have the hardware of a conventional smartphone, with processing circuitry configured to operate according to additional software which is configured to detect, analyse and output information based on the transmitted connectivity information.

Figure 14:
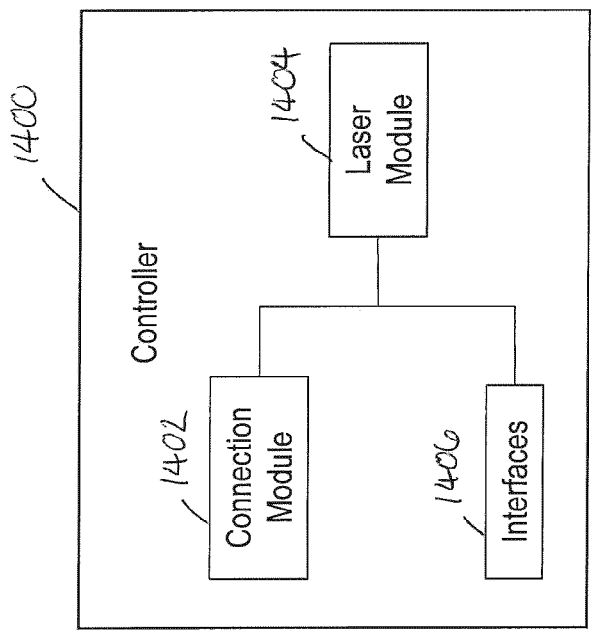
FIG. 14 is a block diagram illustrating functional modules in a portable device.

FIG. 14 illustrates functional modules in another example of controller 1400 which may execute examples of the methods 200 and/or 300 of the present disclosure, for example according to computer readable instructions received from a computer program. It will be understood that the modules illustrated in FIG. 14 are functional modules, and may be realised in any appropriate combination of hardware and/or software. The modules may comprise one or more processors and may be integrated to any degree.

Referring to FIG. 14, the controller 1400 is for an optical transceiver comprising a laser configured to generate an optical signal and a port operable to transmit an optical signal generated by the laser over an optical fiber connected to the port. The controller 1400 comprises a connection module 1402 for determining that a connection anomaly has occurred at a second end of an optical fiber, wherein a first end of the optical fiber is connected to the port of the optical transceiver. The controller 1400 further comprises a laser module 1404 for causing the laser of the optical transceiver to generate an optical signal containing connectivity information for the second end of the optical fiber, wherein a modulation scheme of the optical signal containing connectivity information for the second end of the optical fiber comprises on-off modulation.

The controller 1400 may also comprise interfaces 1406.

Figure 15:
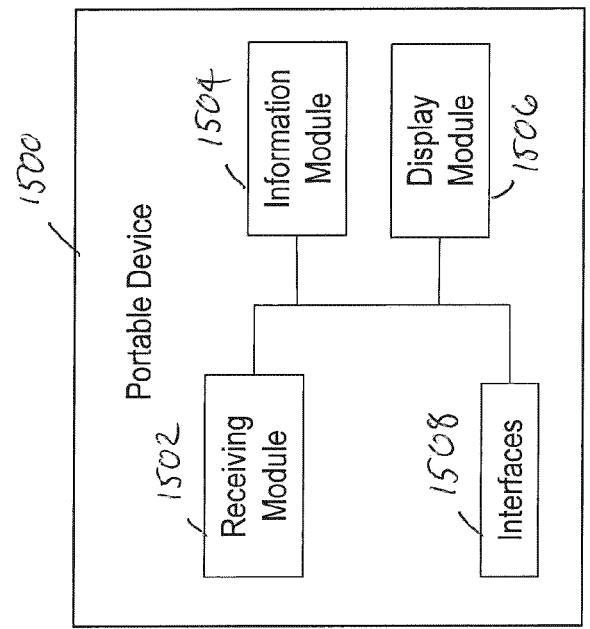
FIG. 15 is a block diagram illustrating functional modules in another example of portable device.

FIG. 15 illustrates functional modules in another example of portable device 1500 which may execute examples of the methods 400 and/or 500 of the present disclosure, for example according to computer readable instructions received from a computer program. It will be understood that the modules illustrated in FIG. 15 are functional modules, and may be realised in any appropriate combination of hardware and/or software. The modules may comprise one or more processors and may be integrated to any degree.

Referring to FIG. 15, the portable device 1500 comprises a video camera and an optical display. The portable device 1500 further comprises a receiving module 1502 for receiving, at the video camera, an optical signal containing connectivity information for a second end of an optical fiber, wherein the second end of the optical fiber is optically coupled to the video camera, and wherein a first end of the optical fiber is connected to an optical transceiver. The portable device 1500 further comprises an information module 1504 for extracting the connectivity information for the second end of the optical fiber from the received optical signal, wherein a modulation scheme of the optical signal containing connectivity information for the second end of the optical fiber comprises on-off modulation. The portable device 1500 further comprises a display module 1506 for displaying the extracted connectivity information for the second end of the optical fiber on the optical display of the portable device. The portable device 1500 may also comprise interfaces 1508. The interfaces 1508 may comprise hardware and/or software interfaces and may facilitate communication between hardware or software elements of the portable device. For example, the interfaces 1306 may include an interface between above discussed functional modules and a radio module as discussed below. In some examples, the portable device 1500 comprises a radio module configured to connect to a radio access network. The radio access network may be, for example, a LTE or NR cellular network. In some aspects, the portable device 1500 may have the hardware of a conventional smartphone, with the information module 1504 configured to operate according to additional software which is configured to detect, analyse and output information based on the transmitted connectivity information.

Examples of the present disclosure thus provide methods and apparatus that enable the provision of service information related to a given fiber through the fiber itself. The information may be transmitted by an optical transceiver of a host equipment as a low speed optical on/off signal, and may be received and decoded by a portable device coupled to the fiber and displaying the transmitted information. The portable device may comprise a wireless device such as a smartphone, with the smartphone video camera acting as an optical receiver. The Service Information transmitted may include Source and Destination Node and Port IDs, Traffic ID, Network ID or any suitable "service information" related to the fiber interconnection.

Examples of the present disclosure improve serviceability by ensuring easy identification of correct fiber interconnection, so reducing the possibility of fiber misconnection. Service information is provided directly through the fiber and is received without requiring dedicated instrumentation but through a portable device such as a smartphone.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for operating an optical transceiver, wherein the optical transceiver comprises a laser configured to generate an optical signal and a port operable to transmit an optical signal generated by the laser over an optical fiber connected to the port, the method, performed by a controller of the optical transceiver and comprising:
   determining that a connection anomaly has occurred at a second end of the optical fiber, wherein a first end of the optical fiber is connected to the port of the optical transceiver; and
   causing the laser of the optical transceiver to generate an optical signal containing connectivity information for the second end of the optical fiber;
   wherein a modulation scheme of the optical signal containing connectivity information for the second end of the optical fiber comprises an on-off modulation.

2. The method as claimed in claim 1, wherein the controller of the optical transceiver is configured to use an operational bit rate and modulation scheme for transmission of data by the optical transceiver in a service provision operational mode, and wherein the bit rate and modulation scheme of the optical signal containing connectivity information for the second end of the optical fiber are different than the operational bitrate and modulation scheme.

3. The method as claimed in claim 1, wherein the connectivity information contained in the optical signal comprises information identifying a destination connection for the second end of the optical fiber.

4. The method as claimed in claim 1, wherein the connectivity information contained in the optical signal comprises at least one of:
   a destination node identifier for the second end of the optical fiber;
   a destination port identifier for the second end of the optical fiber;
   a node identifier of a node associated with the optical transceiver;
   a port identifier of the port of the optical transceiver;
   a traffic identifier for the optical fiber; or
   a network identifier for the optical fiber.

5. The method as claimed in claim 1, wherein causing the laser of the optical transceiver to generate an optical signal containing connectivity information for the second end of the optical fiber comprises operating the optical transceiver in a connectivity assist mode; and
   wherein determining that a connection anomaly has occurred at a second end of an optical fiber, wherein a first end of the optical fiber is connected to the port of the optical transceiver, comprises detecting a connectivity assist trigger.

6. The method as claimed in claim 5, wherein the connectivity assist trigger comprises at least one of:
   an operator initiated trigger; or
   receipt of a loss of signal notification.

7. The method as claimed in claim 1, wherein causing the laser of the optical transceiver to generate the optical signal containing connectivity information for the second end of the optical fiber comprises:
   causing the laser to cease generating an optical signal for a first period of time;
   transmitting a frame alignment symbol;
   causing the laser to generate the optical signal containing connectivity information for the second end of the optical fiber until a termination condition is satisfied; and
   on satisfaction of the termination condition, ceasing to cause the laser to generate the optical signal containing connectivity information for the second end of the optical fiber.

8. The method as claimed in claim 7, further comprising:
   on ceasing to generate the optical signal containing connectivity information for the second end of the optical fiber, attempting to establish signal synchronisation with a destination node coupled to the second end of the optical fiber.

9. A method for operating a portable device, wherein the portable device comprises a video camera and an optical display, the method comprising:

receiving, at the video camera, an optical signal containing connectivity information for a second end of an optical fiber, wherein the second end of the optical fiber is optically coupled to the video camera, and wherein a first end of the optical fiber is connected to an optical transceiver;

extracting the connectivity information for the second end of the optical fiber from the received optical signal; and displaying information based on the extracted connectivity information for the second end of the optical fiber on the optical display of the portable device;

wherein a modulation scheme of the optical signal containing connectivity information for the second end of the optical fiber comprises an on-off modulation.

10. The method as claimed in claim 9, wherein a bit rate of the received optical signal is less than half a frame rate of the video camera and less than at least one of 15 bits/s, 12.5 bits/s, 10 bits/s or 5 bits/s.

11. The method as claimed in claim 9, wherein the connectivity information contained in the optical signal comprises information identifying a destination connection for the second end of the optical fiber.

12. The method as claimed in claim 9, wherein the connectivity information contained in the optical signal comprises at least one of:
a destination node identifier for the second end of the optical fiber
a destination port identifier for the second end of the optical fiber;
a node identifier of a node associated with the optical transceiver;
a port identifier of the port of the optical transceiver;
a traffic identifier for the optical fiber; or
a network identifier for the optical fiber.

13. The method as claimed in claim 9, wherein extracting the connectivity information for the second end of the optical fiber from the received optical signal comprises:
for a video file captured by the video camera during reception of the optical signal, performing one or more of:
converting individual frames of the video file to a sample amplitude value;
normalising the sample amplitude values;
resampling the normalised amplitude values; and
decoding individual bits of the connectivity information by comparing samples to a threshold.

14. The method as claimed in claim 9, wherein the portable device comprises a wireless device.

15. A system comprising an optical transceiver and a portable device,
wherein the optical transceiver comprises a laser configured to generate an optical signal and a port operable to transmit an optical signal generated by the laser over an optical fiber connected to the port;

wherein the portable device comprises a video camera and an optical display;

wherein the optical transceiver is configured to transmit an optical signal containing connectivity information for an optical fiber connected to the port of the optical transceiver via the optical fiber;

and wherein the portable device is configured to receive the optical signal transmitted via the optical fiber using the portable device video camera, and to display the connectivity information contained in the optical signal on the portable device optical display.

16. The system as claimed in claim 15, wherein the optical transceiver is configured to transmit the optical signal containing connectivity information using an on-off modulation scheme.

17. The system as claimed in claim 15, wherein the optical transceiver is configured to transmit the optical signal containing connectivity information at a bit rate that is no greater than half the frame rate of the video camera of the portable device.

18. A controller for an optical transceiver, wherein the optical transceiver comprises a laser configured to generate an optical signal and a port operable to transmit an optical signal generated by the laser over an optical fiber connected to the port, the controller comprising processing circuitry configured to cause the optical transceiver to:

determine that a connection anomaly has occurred at a second end of an optical fiber, wherein a first end of the optical fiber is connected to the port of the optical transceiver; and cause the laser of the optical transceiver to generate an optical signal containing connectivity information for the second end of the optical fiber;

wherein a modulation scheme of the optical signal containing connectivity information for the second end of the optical fiber comprises on-off modulation.

19. A portable device comprising:
a video camera;
an optical display; and
processing circuitry configured to cause the portable device to
receive, via the video camera, an optical signal containing connectivity information for a second end of an optical fiber, wherein the second end of the optical fiber is optically coupled to the video camera, and wherein a first end of the optical fiber is connected to an optical transceiver;
extract the connectivity information for the second end of the optical fiber from the received optical signal; and
display the extracted connectivity information for the second end of the optical fiber on the optical display of the portable device;
wherein a modulation scheme of the optical signal containing connectivity information for the second end of the optical fiber comprises on-off modulation.

* * * * *